United States Patent
Tourin et al.

(10) Patent No.: US 8,942,886 B2
(45) Date of Patent: *Jan. 27, 2015

(54) SYSTEM FOR DETECTING AN IMPACT ON AN AIRCRAFT ENGINE IMPELLER WHEEL

(71) Applicant: SNECMA, Paris (FR)

(72) Inventors: David Tourin, La Rochette (FR); Valerio Gerez, Yerres (FR); Geoffroy Nicq, Thomery (FR)

(73) Assignee: SNECMA, Paris (FR)

( * ) Notice: Subject to any disclaimer, the term of this patent is extended or adjusted under 35 U.S.C. 154(b) by 88 days.

This patent is subject to a terminal disclaimer.

(21) Appl. No.: 13/754,186

(22) Filed: Jan. 30, 2013

(65) Prior Publication Data

US 2013/0197747 A1 Aug. 1, 2013

(30) Foreign Application Priority Data

Jan. 30, 2012 (FR) .................................. 12 50837

(51) Int. Cl.
*G06F 7/00* (2006.01)
*B64D 45/00* (2006.01)
(Continued)

(52) U.S. Cl.
CPC ............. *B64D 45/00* (2013.01); *F01D 21/003* (2013.01); *F01D 21/04* (2013.01); *F02C 7/04* (2013.01); *F05D 2260/80* (2013.01); *Y02T 50/671* (2013.01)
USPC ........ 701/34.4; 415/58.3; 415/58.4; 415/119; 123/21; 123/48 R

(58) Field of Classification Search
CPC ..................... B32B 17/10954; B65G 2249/04; B65G 49/068; B65G 49/069; B65G 57/11; F01D 21/003; F01D 21/14; F01D 21/04; G01N 3/30
USPC .......... 701/34.4; 415/58.3, 58.4, 119; 123/21, 123/48 R; 15/118, 230.12; 156/306.6; 111/174; 442/381; 102/507; 347/45
See application file for complete search history.

(56) References Cited

U.S. PATENT DOCUMENTS 3,597,963 A * 8/1971 Smejkal et al. .................. 73/660
8,386,244 B2 * 2/2013 Ricci et al. ..................... 704/205
(Continued)

FOREIGN PATENT DOCUMENTS

EP 2 199 764 A2 6/2010
FR 2 937 079 A1 4/2010
(Continued)

OTHER PUBLICATIONS

French Search Report issued Aug. 29, 2012 in Patent Application No. 1250837 (with English translation of categories of cited documents).
(Continued)

*Primary Examiner* — McDieunel Marc
(74) *Attorney, Agent, or Firm* — Oblon, Spivak, McClelland, Maier & Neustadt. L.L.P.

(57) ABSTRACT

A method and a system for detecting an impact on an impeller wheel of an aircraft engine. A device acquires a revolutions per minute of the engine and a series of deflection signals representative of the deflections on the blades of the impeller wheel at the revolutions per minute. A device constructs signals for detecting impact on the impeller wheel by correlating each of the deflection signals with a predetermined signature of a shock on a blade at the revolutions per minute.

10 Claims, 5 Drawing Sheets

(51) Int. Cl.
   *F01D 21/00*   (2006.01)
   *F01D 21/04*   (2006.01)
   *F02C 7/04*    (2006.01)

(56) References Cited

U.S. PATENT DOCUMENTS

| | | | |
|---|---|---|---|
| 8,602,734 B2* | 12/2013 | Philippot | 416/97 R |
| 2002/0168260 A1 | 11/2002 | Crotty et al. | |
| 2006/0200035 A1* | 9/2006 | Ricci et al. | 600/513 |
| 2006/0245500 A1* | 11/2006 | Yonovitz | 375/240.19 |
| 2007/0067114 A1 | 3/2007 | D'Amato et al. | |
| 2011/0027103 A1* | 2/2011 | Philippot | 416/97 R |
| 2011/0041474 A1 | 2/2011 | Gerez et al. | |
| 2011/0164785 A1* | 7/2011 | Yonovitz | 382/103 |
| 2011/0313760 A1* | 12/2011 | Ricci et al. | 704/211 |
| 2013/0211768 A1 | 8/2013 | Gerez et al. | |
| 2013/0239653 A1* | 9/2013 | Nicq et al. | 73/12.01 |

FOREIGN PATENT DOCUMENTS

| | | |
|---|---|---|
| FR | 2 956 159 A1 | 8/2011 |
| GB | 2485891 A | 5/2012 |
| WO | WO 2011/054867 A1 | 5/2011 |

OTHER PUBLICATIONS

United Kingdom Search Report issued Jun. 24, 2013 in Patent Application No. 1301604.3.

U.S. Appl. No. 13/792,537, filed Mar. 11, 2013, Nicq, et al.

* cited by examiner

SYSTEM FOR DETECTING AN IMPACT ON AN AIRCRAFT ENGINE IMPELLER WHEEL

TECHNICAL FIELD

The present invention relates to the field of engine surveillance systems and, more particularly, the automatic detection of an impact on an impeller wheel of an aircraft engine.

PRIOR ART

In the course of their missions, aircraft engines are potentially exposed to the ingestion of different objects which can damage them. These objects are in general FOD (Foreign Object Damage) but may optionally be small parts (for example rivets or bolts) detached from the engine, DOD (Domestic Object Damage).

The ingestion of an object constitutes the main cause of flight D&C (Delays and Cancelation). In fact, in most cases, the impact is not noticed by the pilot during the flight and the finding on the blade is made during the control of the airplane just before taking off again.

Studies have shown that for a FOD having a weight greater than around 30 grammes, the probability that the impact is felt by the pilot becomes significant. On the other hand, below around 30 grammes, the impact is no longer felt by the pilot and the damage caused by this type of ingestion may evolve slowly and bring about in the end damage to the engine. An example of this type of ingestion is the impact of a sparrow on the impeller wheel of the HP turbine, the remains of which can obstruct the ventilation holes (HP nozzles) leading to the progressive damaging of the turbine.

Different known solutions exist to detect the ingestion of an object by the engine. One of these solutions consists in using radar type measurement instruments mounted on-board the aircraft to detect the presence of FOD. This solution has nevertheless the drawback of requiring an additional instrumentation which is detrimental to the mass balance of the aircraft.

In order to resolve this kind of problem, the patent FR2937079 of the applicant describes a method making it possible to use permanent accelerometers on the engine. The method is based on the recognition of the characteristic signature of an impact on the fan at the level of the shape of the time signal delivered by the accelerometers present on the engine.

Although very efficient, this method has however several drawbacks. In particular, the typical response of an absorbed shock on the signals delivered by the engine accelerometers is not necessarily that of a FOD but may be the result of a rotor-stator contact. Furthermore, it does not enable the impacted blade to be identified.

The aim of the present invention is consequently to propose a system and a simple detection method to implement and which is capable of detecting with precision and reliability an impact on an impeller wheel of an engine without having the aforementioned drawbacks.

DESCRIPTION OF THE INVENTION

The present invention is defined by a system for detecting an impact on an impeller wheel of an aircraft engine, comprising:
acquisition means for acquiring a revolutions per minute of said engine and a series of deflection signals representative of the deflections on the blades of said impeller wheel at said revolutions per minute, and
correlation means to construct signals for detecting impact on said impeller wheel by correlating each of the deflection signals with a predetermined signature of a shock on a blade at said revolutions per minute.

The system of the present invention makes it possible to detect in real time, in a reliable manner, and with a minimal calculation time, any impact on the impeller wheel caused by an object of any weight ingested by the engine. More particularly, said system makes it possible to detect with precision any impact not felt by the pilot caused for example by a light foreign body.

Thus, the detection system according to the invention makes it possible to monitor in a global manner the 'health' of the fan as well as all the stages downstream thereof.

Advantageously, the system comprises a predetermined series of pseudo-wavelets representing shocks absorbed on a blade according to different revolutions per minute of the engine, and said predetermined signature being selected from said series of pseudo-wavelets as a function of said revolutions per minute.

Resorting to pseudo-wavelets makes it possible to give an accurate representation of the shocks absorbed on a blade while facilitating their correlation with the deflection signals to extract useful and precise information on the impact in a simple, reliable manner, and with a minimal calculation time.

Advantageously, the correlation means are configured to construct a detection signal per blade and per revolutions per minute by calculating a normalised convolution product between the deflection signal relative to said blade and the predetermined signature corresponding to said revolutions per minute; and to compare each of said detection signals at a predetermined threshold in order to attest to the detection of an impact in the case where at least one detection signal exceeds said threshold.

The convolution product between a pseudo-signal and a deflection signal makes it possible to recognise automatically any impact information intrinsically comprised in the deflection signal. In other words, thanks to the pseudo-signal it is essentially possible to recognise the mode of deformation of the blade. Then, the comparison of each of the detection signals at a predetermined detection threshold makes it possible to confirm that the detection signal indeed describes a shock undergone by the impeller wheel and not a simple electronic perturbation. Any false alarm may thus be dismissed.

Advantageously, the correlation means are moreover configured to locate, in the case where an impact is detected, the blade impacted first and the date of said impact by comparing the dates of exceeding the threshold of the different detection signals.

Thus, the maintenance technician can know the identity of the blade that needs to be inspected in an attentive manner.

Advantageously, the system further comprises classification means configured for:
determining the maximal deflection of said blade impacted first;
calculating the impact energy on said blade impacted first as a function of said maximal deflection;
determining the velocity of the object striking the impeller wheel as a function of the velocity of the aircraft and of the revolutions per minute; and
calculating the mass of said objet as a function of said impact energy and said velocity of the object.

Knowledge of the mass of the object provides to the maintenance operators an order of magnitude of the phenomenon detected.

Advantageously, the system moreover comprises message generation means configured to record and/or to send to the ground an engine maintenance message comprising data for identifying the impact among the following data: the date of the impact, the blade impacted first, the mass of the object striking the impeller wheel, and the engine speed at the date of the impact.

The recording or the emission of a maintenance notification makes it possible to stipulate an inspection of damage to repair as quickly as possible the damage brought about following the ingestion of the object and to avoid the long term degradation of the performance of the engine. Thus, the maintenance technician may be informed very quickly of the nature of the ingestion and of the blade impacted first to facilitate maintenance.

The invention also relates to a calculator intended to be mounted on-board an aircraft or in an aircraft engine, comprising a detection system according to any of the above characteristics.

The invention also relates to an aircraft engine comprising a detection system according to any of the above characteristics.

The invention also relates to a method for detecting an impact on an impeller wheel of an aircraft engine, comprising the following steps:
  acquiring a revolutions per minute of said engine and a series of deflection signals representative of the deflections on said blades at said revolutions per minute,
  constructing signals for detecting impact on said impeller wheel by correlating each of the deflection signals with a predetermined signature of a shock on a blade at said revolutions per minute.

The invention also relates to a computer programme comprising code instructions for the implementation of the detection method according to the above characteristics when it is performed by a calculator.

BRIEF DESCRIPTION OF DRAWINGS

Other characteristics and advantages of the invention will become clear on reading the preferential embodiments of the invention made with reference to the appended figures, among which.

DETAILED DESCRIPTION OF PARTICULAR EMBODIMENTS

The basic concept of the invention is based on an automatic recognition of the characteristic shape of the signal of a shock absorbed in free oscillations.

Figure 1:
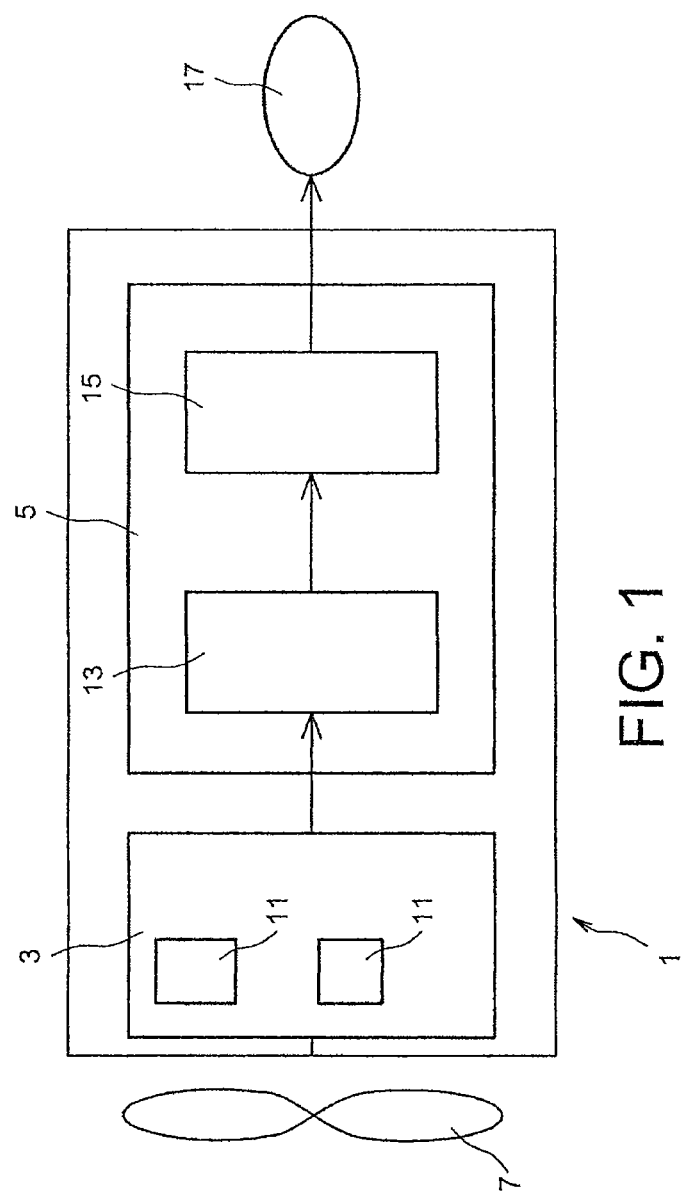
FIG. 1 illustrates in a schematic manner an aircraft engine surveillance system, according to the invention.

FIG. 1 illustrates in a schematic manner an aircraft engine surveillance system, according to the invention.

The surveillance system 1 comprises a measurement system 3 and a system 5 for detecting an impact on an impeller wheel 7 of the engine (not represented).

The impeller wheel 7 may be that of a fan or that of a high pressure (HP) compressor or that of any other component of the engine.

The measurement system 3 comprises one or more sensors 11 giving information on the revolutions per minute of the engine and potential deflections on the blades.

The detection system 5 comprises data acquisition means 13 and correlation means 15.

The acquisition means 13 are configured to acquire from the measurement system 3 the revolutions per minute of the engine as well as a series of deflection signals representative of deflections on the blades of the impeller wheel 7 at said revolutions per minute.

According to the invention, the correlation means 15 are configured to construct signals for detecting impact on the impeller wheel 7 by correlating each of the deflection signals with a predetermined signature of a shock on a blade at said revolutions per minute.

Thus, any detection signal that shows a correlation between a deflection signal and the signature of a shock is an indication of an impact on the impeller wheel.

The detection signals make it possible to detect automatically any impact on the impeller wheel 7 whatever the weight of the ingested object. In other words, the detection signals make it possible to detect impacts not felt by the pilot in addition to those felt by him. In the latter case, the automatic detection makes it possible to confirm that made by the pilot. In addition, when an impact is detected, a temporal classification of the detection signals makes it possible to indicate the order of these impacts and in particular, the blade impacted first.

Thus, after the detection of an impact on the impeller wheel, the detection system 5 can emit an alert message 17.

It will be noted that the detection system 5 may be incorporated in a specific box or form part of an existing electronics box. Advantageously, it is possible to exploit the acquisition and processing means of an on-board calculator in the aircraft or in a calculator incorporated in the aircraft engine of EMU (Engine Monitoring Unit) type to exploit the detection system according to the invention. In particular, the calculator may be used to run a computer programme recorded in storage means of the calculator and comprising code instructions for implementing the detection method according to the invention.

Figure 2:
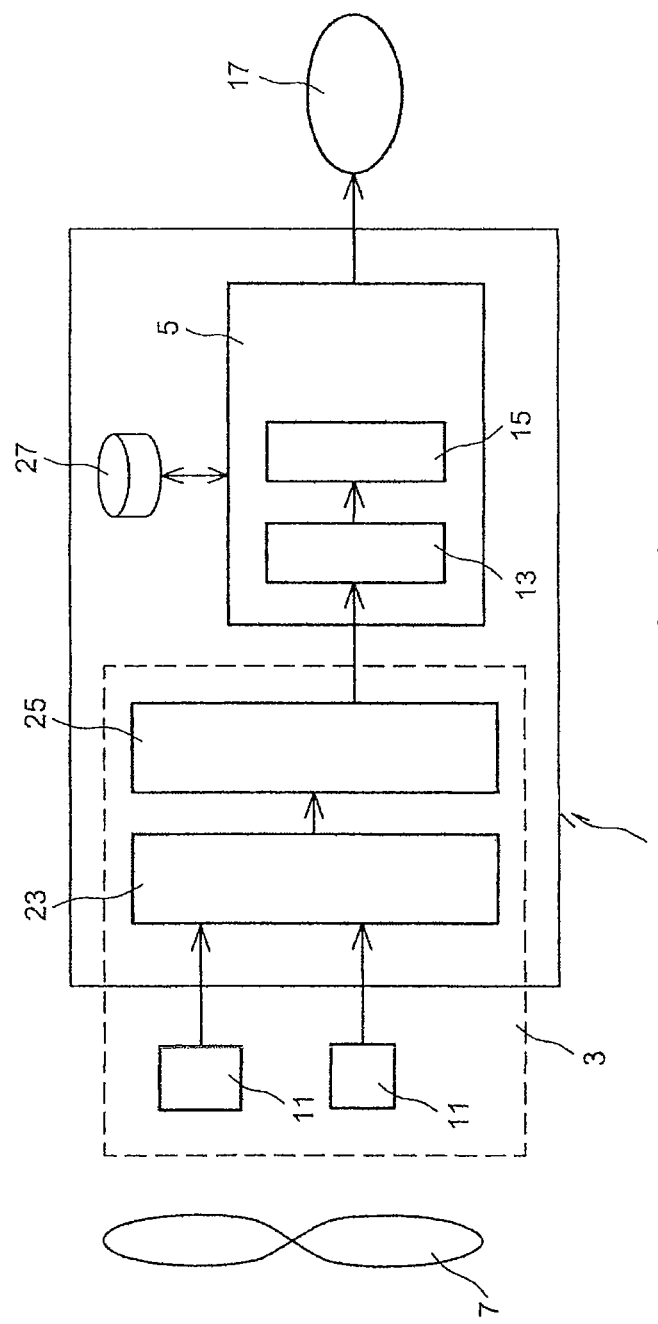
FIG. 2 illustrates in a schematic manner an on-board calculator comprising the detection system of FIG. 1.

In fact, FIG. 2 illustrates in a schematic manner an on-board calculator 21 comprising the detection system 5 according to the invention.

More particularly, the on-board calculator 21 (for example, an EMU) comprises an acquisition interface 23, a pre-processing system 25, and the detection system 5. The acquisition interface 23 is adapted to acquire high frequency (HF) time signals relative to the blades of the impeller wheel 7.

These HF time signals are acquired according to, for example, an operation of "Tip Timing" type in association with at least one sensor 11 installed in line with the impeller wheel 7. In normal operation, without impacts, the blades are going to pass in front of the sensor 11 in a regular manner and the time interval measured between the passage of two consecutive blades is constant at a given engine speed thereby defining a reference time signal. Any modification of the position of a blade at the moment when it passes in front of the sensor 11 in relation to its reference position is thus indicative of a deflection of the blade.

By way of example, the sensor 11 may be a Foucault current sensor or a sensor of capacitive type. These kinds of sensors are robust, precise, not very bulky and do not require specific cleaning.

The acquisition interface 23 is moreover adapted for acquiring the revolutions per minute of the engine. It will be noted that the engine speed may be acquired either in a direct manner thanks to a dedicated sensor 11 coupled to a phonic wheel or according to the Tip Timing method. In fact, an impeller wheel is almost in itself a phonic wheel and the revolutions per minute may be determined from the passage of the blades. Thus, the use of the Tip Timing operation makes it possible both to monitor the blades and to determine the revolutions per minute of the engine.

Furthermore, the time signals relative to the blades are sampled at a high frequency that depends on the revolutions per minute as well as the number and the shape of the blades (the shorter the blades, the stiffer they are and the higher the first mode).

The acquisition interface 23 conditions the measurements or HF time signals from each sensor 11 and sends in real time these input time signals with the measurement of the engine speed corresponding to the pre-processing system 25.

In a manner known per se, the pre-processing system 25 makes it possible to reduce the input HF time signals, which are indirectly representative of the deflections on the blades, into low frequency (LF) deflection signals.

The LF deflection signals are in fact reduced data taking the form of low volume files where the deflections appear at the blade tip for each blade of the impeller wheel 7.

Thus, for an impeller wheel 7 comprising n blades, a file of reduced data comprises n deflection signals as a function of the engine speed. More particularly, at each increment, the pre-processing system 25 records a deflection signal comprising a deflection information concerning a standard blade as well as the measurement of the revolutions per minute. At the end of n increments, the pre-processing means thus form an input file in low frequency format comprising n deflection signals and the corresponding engine speed. Moreover, there are as many files delivered by the pre-processing system as there are sensors 11 opposite the blades.

It will be noted that the sensor(s) 11, the acquisition interface 23 and the pre-processing system 25 of FIG. 2 correspond to the measurement system 3 of FIG. 1.

The detection system 5 is then going to process the deflection signals to detect and analyse any impact on the impeller wheel 7.

Figure 3:
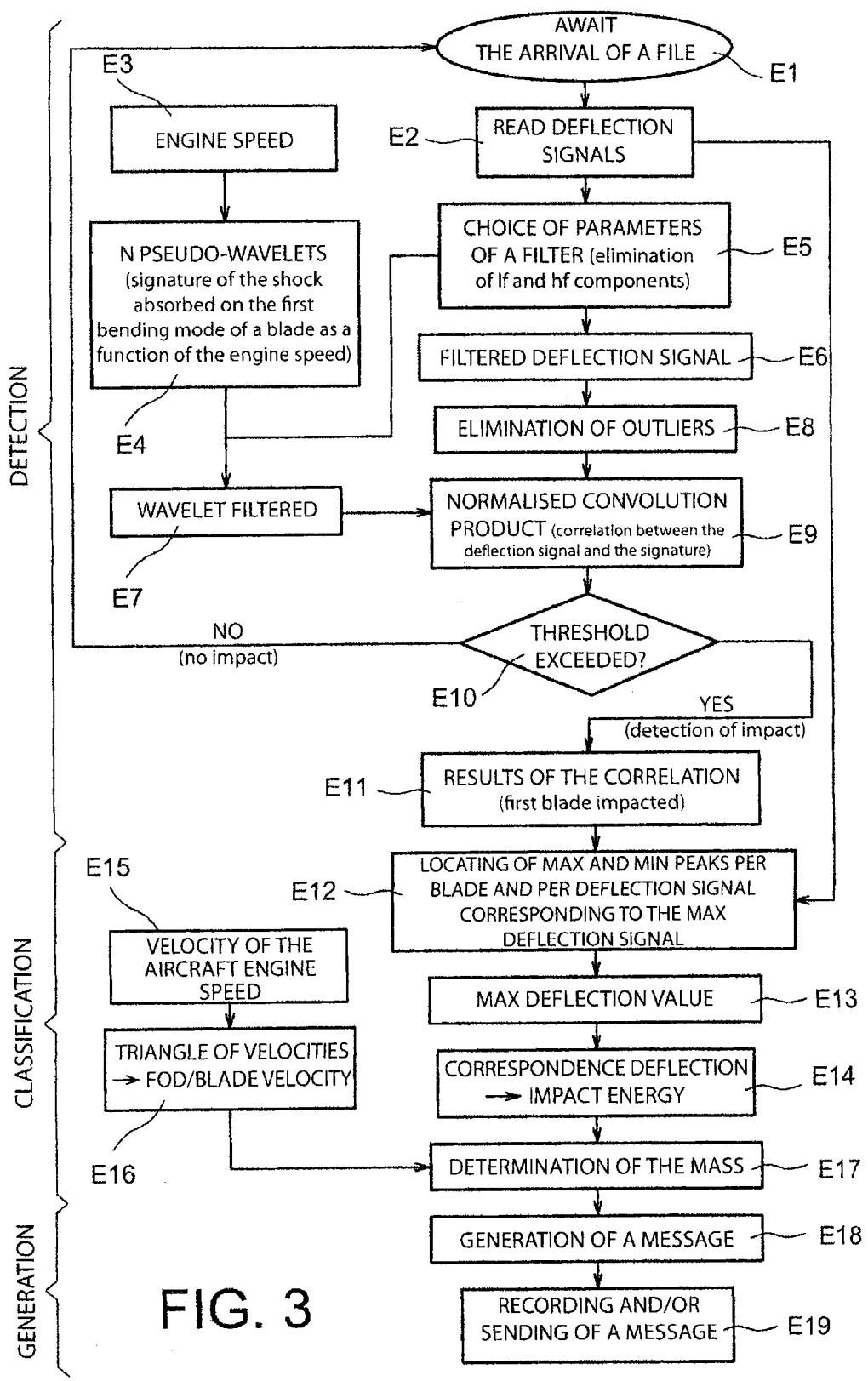
FIG. 3 is a block logic diagram illustrating a preferred embodiment of the detection system, according to the invention.

FIG. 3 is a block logic diagram illustrating a preferred embodiment of the detection system 5 according to the invention. This figure is also an illustration of the steps of a method for detecting an impact according to the invention.

Blocks E1 to E3 correspond to the acquisition means 13 of said detection system 5.

At block (or at step) E1, the detection system 5 awaits the arrival of a file comprising the deflection signals from the pre-processing system 25.

Block E2 relates to the reading of the deflection signals of all the blades of the impeller wheel 7.

In the same way, block E3 relates to the reading of the revolutions per minute corresponding to the deflection signals read at block E2.

Blocks E4 to E11 explain in more detail the operation of the correlation means 15 of said detection system 5.

The correlation means 15 have the function of correlating each of the deflection signals with a predetermined signature representative of a shock on a blade at the revolutions per minute.

A signature representative of a shock may be a sort of time limited oscillatory perturbation. In fact, in the case of shock on a blade, it vibrates on these specific modes, this vibration is absorbed in several engine revolutions.

Advantageously, the signature may be defined by a sort of wavelet or pseudo-wavelet having the shape of an oscillatory wave, the amplitude of which starts at zero, increases during a small time frame, and then decreases to return to zero according to for example a decreasing exponential.

Thus, a catalogue or a predetermined series of pseudo-wavelets representing shocks absorbed on a blade according to different revolutions per minute of the engine may be pre-recorded in storage means 27.

Figure 4:
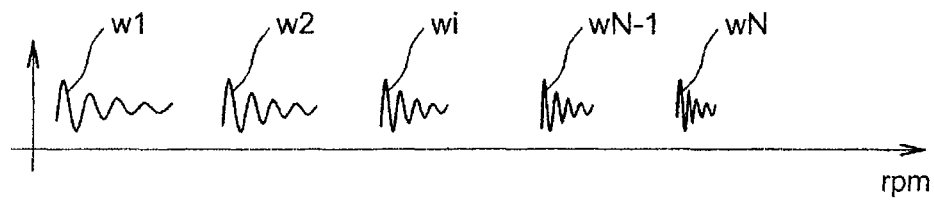
FIG. 4 illustrates a series of pseudo-wavelets as a function of the revolutions per minute, according to the invention.

FIG. 4 illustrates a series of N pseudo-wavelets $w1, \ldots, wN$ as a function of the revolutions per minute (rpm). More particularly, each pseudo-wavelet wi is a signature of a shock absorbed on the first bending mode of a blade as a function of the revolutions per minute. The pseudo-wavelets $w1, \ldots, wN$ thus respond to an initial specification of FOD or DOD detection combined with the revolutions per minute of the engine.

The series of pseudo-wavelets $w1, \ldots, wN$ is constructed beforehand from an impact detection model according to the revolutions per minute and/or bench tests. Advantageously, said pseudo-wavelets are obtained firstly by calculations, then refined by tests.

Thus, at block E4, the predetermined signature is selected from the series of pseudo-wavelets $w1, \ldots, wN$ each corresponding to a signature representative of a shock absorbed on a blade as a function of the revolutions per minute.

In other words, revolutions per minute are used as a selection parameter for choosing as signature the pseudo-wavelet corresponding to said revolutions per minute. This makes it possible to take account of the fact that the specific frequency of the blade changes as a function of the revolutions per minute. In fact, the shape of the blade may change (for example, the blade untwists) under the effect of a centrifugal force thereby bringing about an evolution of the specific frequency of the blade as a function of the rotation of the engine.

At block E5, the deflection signals are filtered according to pre-determined parameters to centre the signals on zero by eliminating the LF and HF components potentially present in the signals. Thus, one obtains at block E6 filtered deflection signals.

Advantageously, a filtering operation is also carried out on the pseudo-wavelet selected at block E4 to obtain at block E7 a filtered pseudo-wavelet.

In fact, the filtration of the deflection signals may optionally dephase these signals. Thus, the same filtration parameters are chosen to filter the pseudo-wavelet and the deflection signals in order to enable the signature to resemble as closely as possible the shock present in the deflection signals.

At block E8, one eliminates isolated or aberrant data (outliers) potentially present in the deflection signals which may be due, for example, to electrical shocks or random errors.

At block E9, the correlation means 15 are configured to construct a detection signal per blade and per revolutions per minute. Thus, for a given blade, the correlation means 15 calculate the convolution product between the deflection signal relative to said blade and the predetermined signature (i.e., the pseudo-wavelet chosen at block E4) corresponding to said revolutions per minute.

Advantageously, the convolution product is normalised (for example to 1) to overcome the amplitude of the shock and to recognise the latter uniquely on the shape due to the specific pseudo-frequency and to the shock absorption (both being known). The closer the normalised score of the convolution product approaches 1, the higher the detection probability. This operation is carried out as many times as there are blades present on the impeller wheel 7.

The detection signal then indicates the existence or the non existence of a correlation between the deflection signal (representative of the deflection of the blade) and the signature representative of a shock.

At block E10, the correlation means 15 are configured to compare each of the detection signals with a predetermined detection threshold in order to attest to the detection of an impact in the case where at least one detection signal exceeds said threshold. It will be noted that the threshold may be adjusted by experimentation and/or operational feedback.

Figure 5:
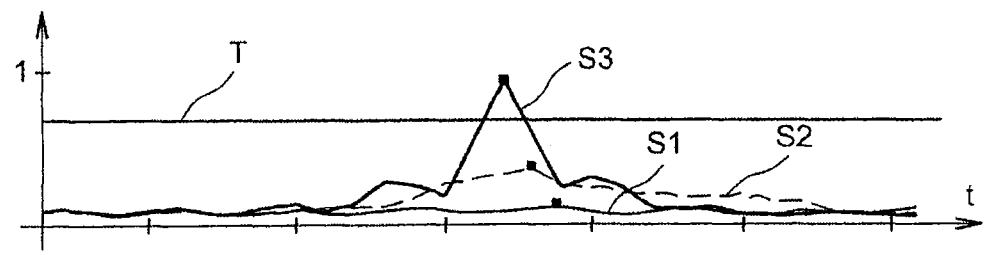
FIG. 5 is a graph illustrating the thresholding of the detection signals, according to the invention.

FIG. 5 is a graph illustrating an example of comparison of detection signals S1-S3 at a predetermined threshold T.

This graph illustrates the case of normalised detection signals (i.e., of a normalised convolution product) with, by way of example, a threshold of the order of 0.7.

The detection signal S1 is indicative of a sound deflection signal. The detection signal S2 is indicative of a deflection signal resulting from a dynamic phenomenon. The signals S1 and S2 do not exceed the threshold value T. Finally, the detection signal S3 showing a peak that exceeds the threshold value T is indicative of a deflection signal resulting from an impact on a blade.

Thus, at block E10 one determines if a detection signal exceeds the threshold T or not. In the first case, one goes to block E11 and, if not, one loops back to block E1. These operations are carried out simultaneously for each blade.

In fact, if no exceeding of the threshold is detected, one returns to the initial block E1 to await the arrival of another file comprising the deflection signals.

On the other hand, at block E11 (i.e. in the case where an impact is detected), the correlation means are configured to locate the blade impacted first and the date of said impact by comparing the dates of exceeding the threshold T of the different detection signals.

More particularly, by classifying over time the different detection signals relative to the different blades, it is possible to locate the blade impacted first and more generally the order of succession of the impacts on the different blades.

Figure 6:
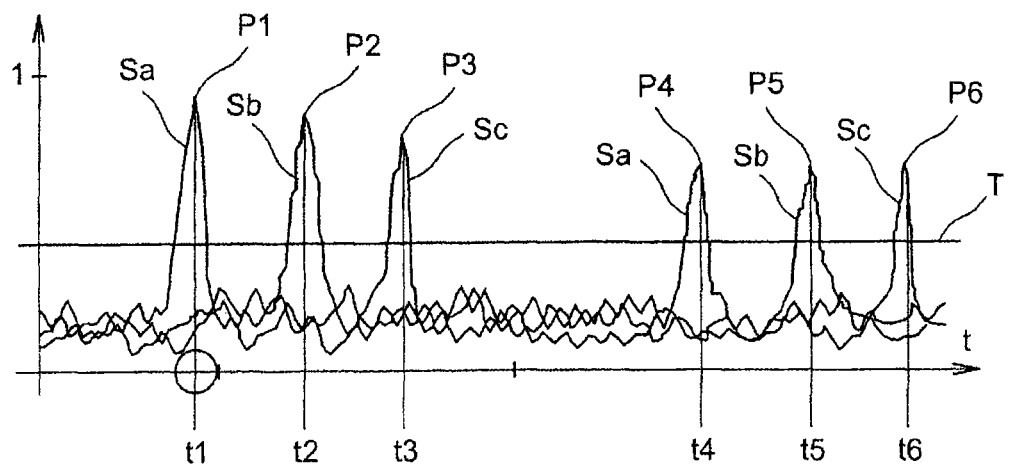
FIG. 6 is a graph illustrating an evolution of the detection signals, according to the invention.

In fact, FIG. 6 is a graph illustrating the evolution of several detection signals in relation to the impact detection threshold T. This example shows the evolution of three detection signals Sa, Sb, Sc relative to three blades a, b, c (not represented).

The detection signal Sa shows a first peak P1 which exceeds the threshold value T at the time t1. Said first peak P1 then makes it possible to indicate the first blade impacted and the time of said impact. The second and third peaks P2, P3 provide information on the identities of the blades impacted secondly and thirdly respectively and the times t2, t3 of these impacts. The fourth, fifth and sixth peaks P4, P5, P6 give the times t4, t5, t6 of the secondary shocks on the three blades.

Thus, after the detection of an impact on the impeller wheel, the detection system 5 can emit an alert message 17 comprising an identification of the blade impacted first.

Advantageously, the alert message 17 may comprise more precise information on the impact and in particular a classification or an identification of the object behind the impact.

Figure 7:
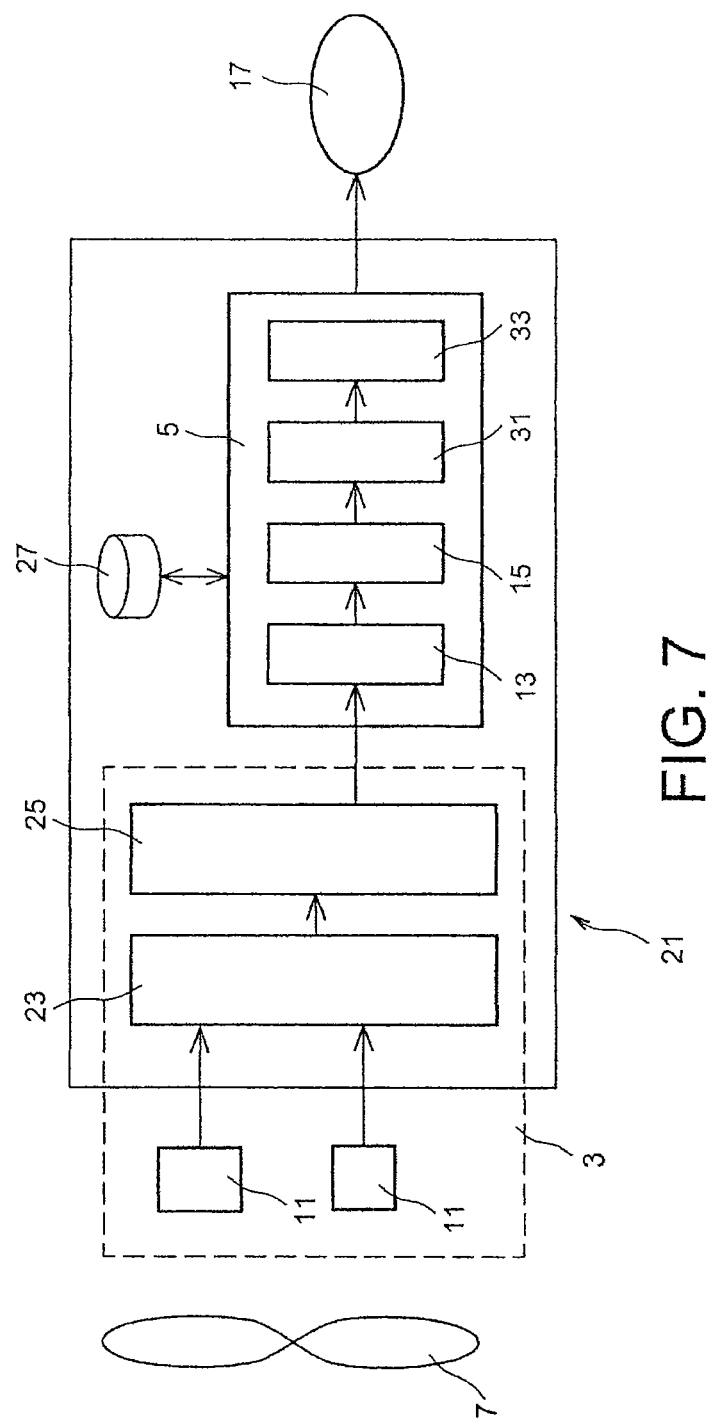
FIG. 7 illustrates in a schematic manner an on-board calculator comprising the detection system, according to another embodiment of the invention.

In fact, according to another embodiment, FIG. 7 shows that the detection system 5 comprises classification means 31 in addition to acquisition 13 and correlation 15 means.

The classification means 31 are explained by blocks E12 to E17 of FIG. 3.

At block E12, the classification means 31 are configured to determine the maximal amplitude of the deflection signal relative to the blade impacted first.

More particularly, a locating is carried out of the maximal peak and the minimal peak on the deflection signal (read at block E2) relative to the first blade impacted (determined previously at block E11). This makes it possible to obtain at block E13, the maximal amplitude on the first pseudo-period of the shock which corresponds in fact to the maximal deflection value.

At block E14, the classification means 31 are configured to calculate the impact energy on the blade impacted first as a function of the maximal deflection value.

The search for correspondence between the deflection signal and the impact energy may be deduced, as a first approximation, from a preliminary modelling giving energy values as a function of the deflection of the blade.

In a variant, the relation between the deflection signal and the impact energy consists in establishing a correspondence table between the measured deflection and the impact energy from experimental tests and/or operational feedback.

At blocks E15 and E16, the classification means 31 are configured to determine the velocity of the object striking the impeller wheel 7 (bloc E16) as a function of the velocity of the aircraft and the revolutions per minute of the engine (bloc E15). In fact, from the velocity of the aircraft (corresponding globally to the axial component of the velocity of the object in relation to the blade) and the revolutions per minute (giving the tangential component of the velocity of the object in relation to the blade), one determines the resulting velocity of the object in relation to the blade. The hypothesis is all the same made that the velocity of the object in relation to the blade is equal to the velocity of the aircraft in relation to the ground. This is true in the case of ingestion of stones or of any other object lying around on the runway in taxiing and taking off phases. On the other hand, for a volatile, the latter is not immobile in relation to the aircraft and it may move further away or come closer to it. Nevertheless, the error introduced by this hypothesis is of the second order because the velocity of the volatile moving towards the aircraft, or moving away from the aircraft, is negligible compared to that of the aircraft at the end of take off. In addition, the composition of velocities shows that the engine being in take-off rpm it is above all the tangential component which is preponderant in view of the axial velocity.

At block E17, the classification means 31 are configured to calculate the mass of the object as a function of the impact energy (corresponding to the kinetic energy of the object) and of the velocity of said objet, using the kinetic energy formula.

Advantageously, the detection system also comprises message generation means 33 (see FIG. 7) corresponding to blocks E18 and E19 of FIG. 3.

At block E18, the generation means 33 generate an impact detection and identification message 17 comprising the date or the time of the impact, the blade impacted first, the mass of the object causing the impact, and the engine speed at the impact date.

At block E19, the generation means 33 are configured to record in storage means (for example, in the memory means of the calculator 21), a message or a maintenance notification of the engine comprising the identification data of the impact determined at block E18. Thus, the maintenance notification may be discharged to the ground by the maintenance team of the engine.

Advantageously, the generation means 33 make it possible to transmit the maintenance notification to the ground using the ACARS (aircraft communication, addressing and reporting system) data transmissions system of the aircraft The maintenance notification enables the maintenance team to repair as quickly as possible the damage brought about following the ingestion of the object and to avoid the long term degradation of the performances of the engine.

It will be noted that the construction of detection signals as well as the classification of impacts require very little calculating time and may easily be performed in real time. In variants, these operations may also be carried out at a later time in order to optimise the calculating time of the calculator during the flight.

The invention claimed is:

1. A system for detecting an impact on an impeller wheel of an aircraft engine, comprising:
   acquisition means for acquiring a revolutions per minute of said engine and a series of deflection signals representative of the deflections on the blades of said impeller wheel at said revolutions per minute, a deflection signal being defined by a modification of the position of a blade at the moment when it passes in front of a sensor in relation to its reference position, and
   correlation means for constructing signals for detecting impact on said impeller wheel by correlating each of the deflection signals with a predetermined signature of a shock on a blade at said revolutions per minute.

2. A detection system according to claim 1, wherein a predetermined series of pseudo-wavelets (w1, . . . , wN) representing shocks absorbed on a blade according to different revolutions per minute of the engine, and in that said predetermined signature is selected from said series of pseudo-wavelets as a function of said revolutions per minute.

3. A detection system according to claim 1, wherein the correlation means are configured to construct a detection signal (Sa, Sb, Sc) per blade and per revolutions per minute by calculating a normalised convolution product between the deflection signal relative to said blade and the predetermined signature corresponding to said revolutions per minute; and to compare each of said detection signals with a predetermined threshold (T) in order to attest to the detection of an impact in the case where at least one detection signal exceeds said threshold.

4. A detection system according to claim 1, wherein the correlation means are moreover configured to locate, in the case where an impact is detected, the blade impacted first and the date of said impact by comparing the dates of exceeding the threshold of the different detection signals.

5. A detection system according to claim 4, further comprising classification means configured for:
   determining the maximal deflection of said blade impacted first;
   calculating the impact energy on said blade impacted first as a function of said maximal deflection;
   determining the velocity of the object striking the impeller wheel as a function of the velocity of the aircraft and the revolutions per minute; and
   calculating the mass of said objet as a function of said impact energy and said velocity of the object.

6. A detection system according to claim 5, further comprising message generation means configured to record and/or to send to the ground an engine maintenance message comprising identification data of the impact among the following data: the date of the impact, the blade impacted first, the mass of the object striking the impeller wheel, and the engine speed at the date of the impact.

7. A calculator intended to be mounted on-board an aircraft or in an aircraft engine, said calculator comprising acquisition and processing means, wherein said acquisition and processing means are configured to exploit the detection system according to claim 1.

8. An aircraft engine, comprising a detection system according to claim 1.

9. A method for detecting an impact on an impeller wheel of an aircraft engine, comprising:
   acquiring a revolutions per minute of said engine and a series of deflection signals representative of the deflections on said blades at said revolutions per minute, a deflection signal being defined by a modification of the position of a blade at the moment when it passes in front of a sensor in relation to its reference position, and
   constructing signals for detecting impact on said impeller wheel by correlating each of the deflection signals with a predetermined signature of a shock on a blade at said revolutions per minute.

10. A computer readable storage medium comprising code instructions for implementing the detection method according to claim 9 when it is performed by a calculator.

* * * * *